United States Patent
Seweekool (10) Patent No.: US 12,084,358 B2
(45) Date of Patent: Sep. 10, 2024

(54) TIDE WATER FILTERING TANKS HAVING HIGH CIRCULATION

(71) Applicant: OSHO FILTRATION CO., LTD., Sub-district Mueang (TH)

(72) Inventor: Asia Seweekool, Kunlaphan Ville Village (TH)

(73) Assignee: OSHO FILTRATION CO., LTD. (TH)

( * ) Notice: Subject to any disclaimer, the term of this patent is extended or adjusted under 35 U.S.C. 154(b) by 444 days.

(21) Appl. No.: 17/625,104

(22) PCT Filed: Aug. 26, 2020

(86) PCT No.: PCT/TH2020/000061
§ 371 (c)(1),
(2) Date: Jan. 6, 2022

(87) PCT Pub. No.: WO2021/040631
PCT Pub. Date: Mar. 4, 2021

(65) Prior Publication Data
US 2022/0259068 A1    Aug. 18, 2022

(30) Foreign Application Priority Data

Aug. 29, 2019 (TH) ................................ 1901005341

(51) Int. Cl.
*C02F 1/00* (2023.01)
*B01D 24/00* (2006.01)
(Continued)

(52) U.S. Cl.
CPC ............ *C02F 1/004* (2013.01); *B01D 24/005* (2013.01); *B01D 24/007* (2013.01); *B01D 24/06* (2013.01); *B01D 24/40* (2013.01)

(58) Field of Classification Search
CPC . C02F 1/004; C02F 3/04; C02F 3/327; B01D 24/005; B01D 24/007; B01D 24/06;
(Continued)

(56) References Cited

U.S. PATENT DOCUMENTS

| 5,707,527 A | 1/1998 | Knutson et al. |
| 10,021,860 B2 | 7/2018 | Plante |
| 10,334,839 B2 | 7/2019 | Deurloo |

FOREIGN PATENT DOCUMENTS

JP            6548220 B2 *  7/2019

* cited by examiner

*Primary Examiner* — Waqaas Ali (57) ABSTRACT

A water filtering tank comprising a housing of the water filtering tank, water inlet pipe (3) installed on the housing receiving water into the tank, water distributing sheet (2) in which the said sheet is arranged inside the tank at the height lower than the inlet pipe (3) in which the said distributing sheet receives water flow through the inlet and comprises a plurality of pores positioned throughout the said sheet, rough filtering basket (1) in which the supporting lower surface comprises a plurality of pores and the said basket comprises rough filtering materials inside which arranged in the basket at the height less than the distributing sheet (2) and receives water flow through the said water distributing sheet, filtering material basket which is arranged inside the basket at the height less than that of the rough filtering basket (1) and comprises the filtering materials arranged into multiple layers and water outlet pipe (7) installed with the housing and releases water. Characterized in that the water filtering basket comprises a siphon tube supporting base (6) which is arranged at the lower part of the housing and further comprises a water outlet standing pipe (8) vertically installed on the said base and has the height less than the height of the inlet in which water is sucked out of the housing through the lower water outlet standing pipe (8)

(Continued)

connected with the water outlet pipe (7) when water level filled inside the housing is at the same level as that of the water outlet standing pipe (8), siphon tube (10) covering the water outlet standing pipe (8) and further comprises snock tube (11) in which is in the U-shape having one end connected with the siphon tube at the predetermined height.

6 Claims, 9 Drawing Sheets (51) Int. Cl.
  *B01D 24/06* (2006.01)
  *B01D 24/40* (2006.01)
(58) Field of Classification Search
  CPC ......... B01D 24/40; Y02P 60/21; A01G 31/02; Y02W 10/10
  See application file for complete search history.

TIDE WATER FILTERING TANKS HAVING HIGH CIRCULATION

FIELD OF INVENTION

Engineering in relation to water filtering tanks

BACKGROUND OF INVENTION

The first topic related to the background of the Invention is an aquaponics system which comprises planting in a low-level tray and raising fish at the same time. The aforementioned utilizes the principle of low-water circulation which brings water into a planting tray for approximately 30-40 minutes and out of a planting tray for approximately 10-20 minutes. This is done by using a low-level bell siphon and a small stand water outlet pipe. These allow the siphoning of water out of the said tray having the low-flow rate which leads to the low level of water circulation appropriate to planting and energy saving. The problem found from this system is that a low level of water circulation of not more than 48 rounds per day is sufficient and good for planting; however, this is not sufficient for water treatment to the extent that ammonia is removed for the purpose of aquaculture. Therefore, we commonly see agriculturists including other types of water treatment systems in aquaculture ponds having an aquaponics system.

In an aquaponics system, there is a release of water from the planting tray so that the plant roots can contact oxygen thereby preventing root rot. This is a good aspect. However, filtering materials in the trays have less time to be in contact with water when compared to the method of positioning filtering materials in water all of the time. This then may not result in full water treatment performance which leads to a lower performance when compared to regular filtering tanks for aquatic animals.

The siphoning cylinder and outlet stand pipe of an aquaponics system are small when compared to the size of a planting tray in order to provide low water circulation that is sufficient and suitable for planting. These; however, are not sufficient to cleanly treat water for the purpose of aquaculture.

In an aquaponics system, the outlet stand pipe utilizes external and internal threading joints for attaching to the tray. In the long term, there may be a leakage in the area around the said joints.

The outlet pipe in the aquaponics system has the direction outward from the bottom of the tray thereby making it is necessary to lift up the tray base. Therefore, this causes an issue of secure stability and may not provide a pleasing look to the system.

In an aquaponics system, there is a loud sound when the bell siphon is stopped due to air mass. Such sound can be loud and become clearer during the night and which can disturb neighborhood residents.

For the second topic related to background of the invention, this refers to the general principle of water filtering tanks for aquatic animals. Water is released into the filtering tanks through filtering materials such as volcanic stones, filtering fibers, etc. and then further released from the filtering tanks. There are three approaches. The first is to allow the flow from the top to the bottom. The second is to allow the flow at the bottom to the top. The third is to utilize high pressure filtering tanks. There are problems found in the said three approaches which will be further described below.

Filtering materials cannot be used effectively when the system is used for a certain period of time. This is because there is waste left inside the filter thereby partially clogging the filtering materials and causing a bad smell inside. Water will then only flow through the filtering materials that have not been clogged. Filtering materials therefore can only be partially used and do not provide full efficiency. Water circulation will be good only during a certain period of time and will be worse thereafter.

Therefore, there is a need to use an air pump in order to add oxygen into the filtering tank. This will be for complete water treatment. However, more energy and a larger budget along with additional installation procedures for an electrical system are required in relation to the use of an air pump. However, without an air pump, there will be a bad smell and incomplete water treatment inside the filtering tanks.

Water entering the filtering tanks may be contained by a certain part of the filtering materials thereby leading to the materials clogging and its operation not realizing full performance. This is particularly applicable to the first form of filtering tanks in which the water flows from the top to the bottom.

There is also difficulty in cleaning and management as the filtering materials are arranged by being placed in an overlapping manner until the same fills up the filtering tanks. This leads to difficulty in terms of maintenance and a longer time is required for the said purpose.

In low-water circulation, particularly the third approach which utilizes high-pressure filtering tanks, in the operation, high-pressure water is released into the layered filtering materials in the filtering tanks. The said filtering materials will obstruct the flow of water and significantly reduce the speed of the water released from the filtering tanks, thereby causing a low volume of water to be circulated and also wastes electrical power.

Based on the two topics of the prior arts as mentioned, this caused an inspiration to develop and improve the invention in a more complicated manner. The inventor therefore invented new water filtering tanks for aquatic animals and resolved the problems found in the said two systems which are aquaponics systems related to planting in trays together with raising fish and the old filtering tank system for aquatic animals.

SUMMARY OF THE INVENTION

Tide water filtering tanks having high circulation were developed to solve the problems of the two systems which are aquaponics systems related to planting in trays together with raising fish and the old filtering tank system for ornamental fish. The inventor designed new water filtering tanks for aquatic animals to allow tide-water inside a high-level tank. The components were designed to be optimally compatible with each-other for the purpose of enabling high-water circulation and a high volume of water treatment. A large siphon pipe is connected to the filtering tanks with a large coupler and a tread coupler. This allows the increase of 5-10 times with regard to air and water circulation when compared to the bell siphon used in aquaponics systems. This water filtering tank has a high water circulation rate and will release water from the tank in less than one minute in each round of operation. Toxic ammonia is filtered out of the water to the extent that the water can be used for raising aquatic animals, particularly, ornamental fish such as fancy carp.

A water filtering tank comprising a housing of the water filtering tank, water inlet pipe (3) installed on the housing receiving water into the tank, water distributing sheet (2) in which the said sheet is arranged inside the tank at the height lower than the inlet pipe (3) in which the said distributing sheet receives water flow through the inlet and comprises a plurality of pores positioned throughout the said sheet, rough filtering basket (1) in which the supporting lower surface comprises a plurality of pores and the said basket comprises rough filtering materials inside which arranged in the basket at the height less than the distributing sheet (2) and receives water flow through the said water distributing sheet, filtering material basket which is arranged inside the basket at the height less than that of the rough filtering basket (1) and comprises the filtering materials arranged into multiple layers and water outlet pipe (7) installed with the housing and releases water. Characterized in that the water filtering basket comprises a siphon tube supporting base (6) which is arranged at the lower part of the housing and further comprises a water outlet standing pipe (8) vertically installed on the said base and has the height less than the height of the inlet in which water is sucked out of the housing through the lower water outlet standing pipe (8) connected with the water outlet pipe (7) when water level filled inside the housing is at the same level as that of the water outlet standing pipe (8), siphon tube (10) covering the water outlet standing pipe (8) and further comprises snock tube (11) in which is in the U-shape having one end connected with the siphon tube at the predetermined height In one aspect, the rough filtering basket (1) comprises fins dispersedly arranged on the upper surface of the basket In the other aspect, the rough filtering basket (1) comprises the overflow water tube (4) vertically installed on the surface of the said basket In the other aspect, the area inside the filtering material basket is divided into multiple spaces for containing filtering materials In the other aspect, further comprising siphon tube connector (18) arranged to connect siphon tube (10) with the siphon tube supporting base (6)

Tide water filtering tanks having high circulation release partial water in each round of circulation thereby allowing filtering materials to contact water for a longer period of time. This leads to a better water treatment and more water circulation and also the addition of air into the filtering system. When compared to aquaponics systems, water is completely released from the trays in which there is less time for filtering materials to contact water.

The inventor can control the remaining water inside the tanks to the desired level through the use of a U-turn shape snock pipe (20). The said pipe also reduces the loud sounds caused from the stop of the siphoning due to the air mass. The reduction of the sound level is more than 70 percent when compared to that caused by the use of a bell siphon in aquaponics systems without the said sound proofing or reduction equipment.

The position of the water outlet pipes of the tidewater filtering tanks having high circulation are arranged on the side of the tank. Therefore, the filtering tank itself can be positioned on the floor. Such positioning allows for a strong and stable installation without the need to use a base or stand to support the filtering tanks. This is different from aquaponics systems in which the tray needs to be lifted up by using the supporting base due to the positioning of the water outlet pipe at the bottom.

Inside the tide water filtering tanks having high circulation, the level of water is changed all the time causing air and water to be naturally circulated into the filtering system without the use of an oxygen pump. This allows for full filtering efficiency and the complete flow of water through filtering materials and also energy saving.

For these tidewater filtering tanks having high circulation, water and air are distributed and circulated into filtering system at a certain speed. The filtering materials thus fully contact water and air and enable the full filtering performance of the filtering materials without causing a bad smell. This is different from the general water filtering tanks for aquatic animals which have a lower circulation, a high possibility of the filtering materials clogging, lack of oxygen, and causing a bad smell.

The tide water filtering tanks having high circulation can be cleaned in an easier manner when compared to the other filtering systems. The use of baskets separating filtering materials into different layers allows the ease of maintenance and cleaning. This is different from the other systems in which the filtering materials are positioned in an overlapping manner. Such positioning leads to a difficulty in maintenance and cleaning.

The objectives and unique characteristics and other aspects of this invention will be described in more detail by way of the examples and drawings included and the best mode will also be further described.

DETAILED DESCRIPTION OF PREFERRED EMBODIMENTS

For a better understanding of the preferred embodiment and to show how it may be performed, it will now be described in more detail by way of examples only with reference to the accompanying drawings. The parts shown in the drawings will be represented by the referenced numbers. The description, however, does not imply to any limitation, and the scope of the invention will be in accordance with the claims attached herein.

A water filtering tank comprising a housing of the water filtering tank, water inlet pipe (3) installed on the housing receiving water into the tank, water distributing sheet (2) in which the said sheet is arranged inside the tank at the height lower than the inlet pipe (3) in which the said distributing sheet receives water flow through the inlet and comprises a plurality of pores positioned throughout the said sheet, rough filtering basket (1) in which the supporting lower surface comprises a plurality of pores and the said basket comprises rough filtering materials inside which arranged in the basket at the height less than the distributing sheet (2) and receives water flow through the said water distributing sheet, filtering material basket which is arranged inside the basket at the height less than that of the rough filtering basket (1) and comprises the filtering materials arranged into multiple layers and water outlet pipe (7) installed with the housing and releases water. Characterized in that the water filtering basket comprises a siphon tube supporting base (6) which is arranged at the lower part of the housing and further comprises water outlet standing pipe (8) vertically installed on the said base and has the height less than the height of the inlet in which water is sucked out of the housing through the lower water outlet standing pipe (8) connected with the water outlet pipe (7) when water level filled inside the housing is at the same level as that of the water outlet standing pipe (8), siphon tube (10) covering the water outlet standing pipe (8) and further comprises snock tube (11) in which is in the U-shape having one end connected with the siphon tube at the predetermined height.

Figure 1:
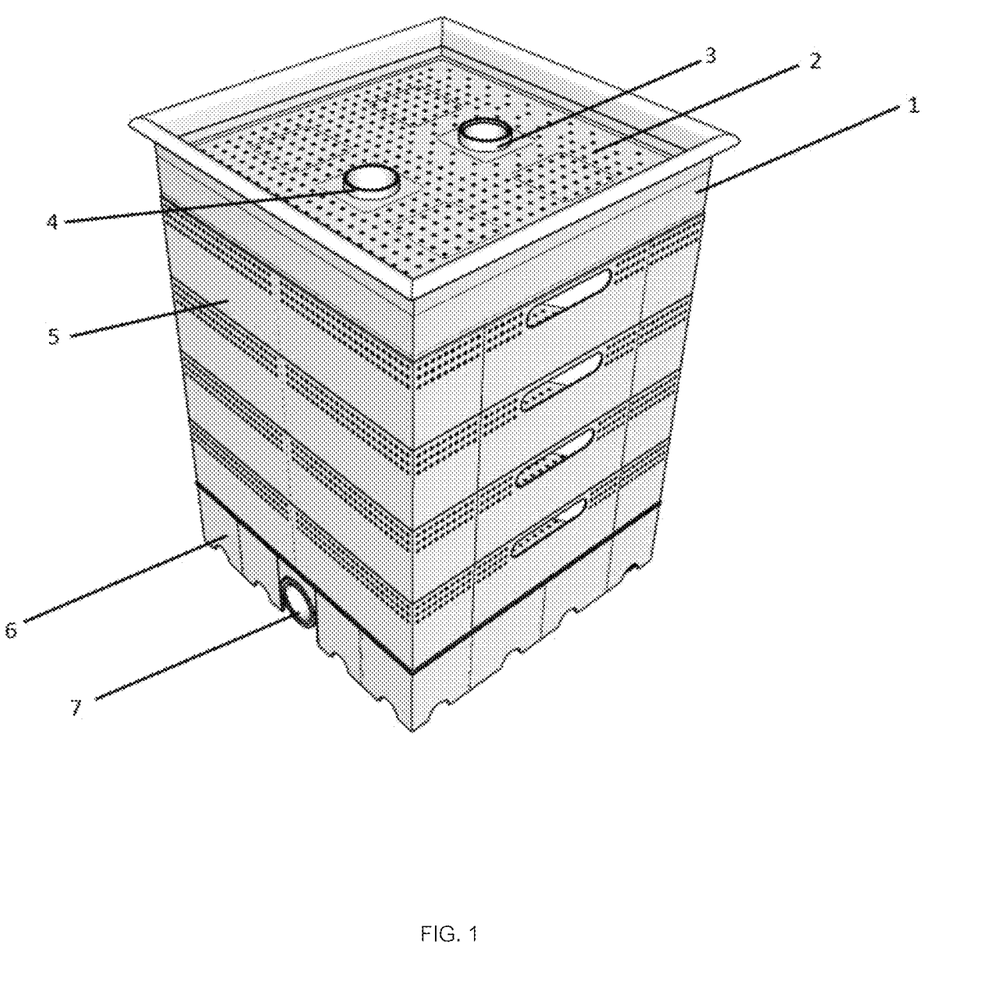
FIG. 1 shows a 3D perspective view of the tide water filtering tanks having high circulation
Figure 8:
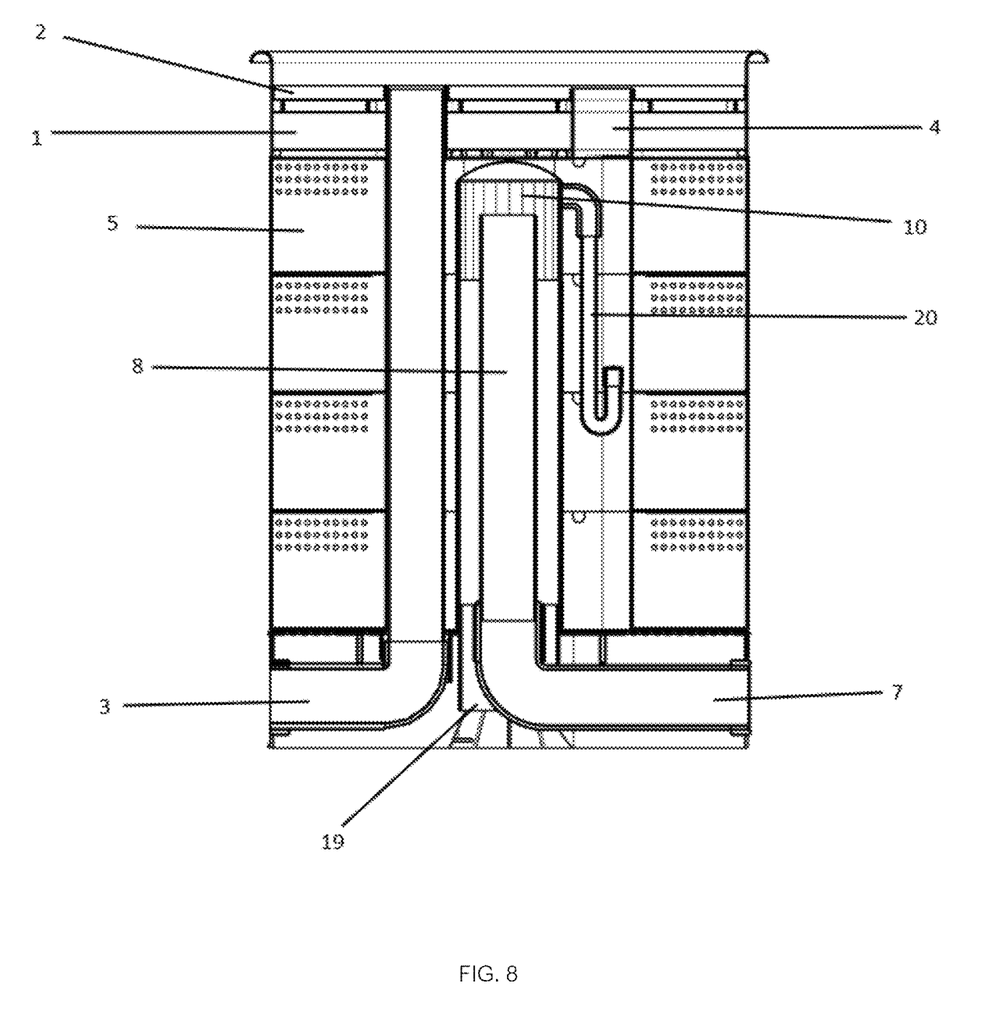
FIG. 8 shows the cross sectional and vertical view of FIG. 1

FIG. 1 show the 3D perspective view of the tide water filtering tanks having high circulation which comprises coarse filtering basket (1), water distribution sheet (2), water inlet pipe (3), overflow water pipe (4), filtering basket (5), siphon pipe base (6) and water outlet pipe (7). For an operational principle, water flows into the tank through the water inlet pipe (3) and is distributed by the water distributing tray (2) and falls into the coarse filtering materials arranged between the water distribution sheet (2) and the coarse filtering basket (1). Water will then flow through the filtering materials in each layer of the filtering basket (5) in a raining manner until the water level inside the tank reaches the opening of the outlet stand pipe (8) as shown in FIG. 8. Thereafter, water is siphoned from the filtering tank through the water outlet pipe (7) at a high speed. Then, the siphoning process will be stopped and the water in the U-turn shape snock pipe (20) will be sucked up completely and the air will flow into siphon pipe thereby stopping the siphoning process.

Figure 2:
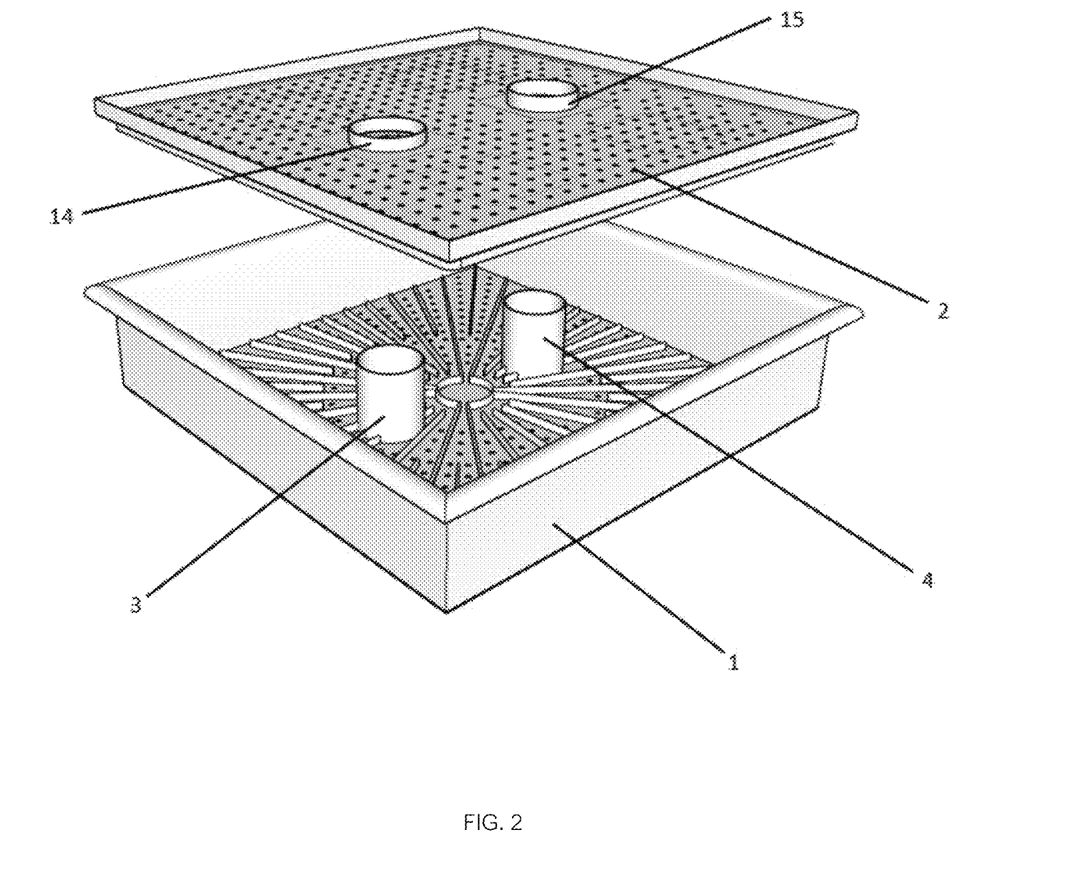
FIG. 2 shows the coarse filtering basket and the water distribution sheet

FIG. 2 shows the coarse filtering basket and water distribution sheet.

In a general filtering systems, in the part of the water inlet pipe, there can be a clog in the filtering materials, so the coarse filtering basket (1) is used to assist in the distribution of water onto the filtering materials in a uniform manner. This further comprises the water distribution tray (2) in the form of a sieve sheet having holes throughout the said sheet. The same is placed on the top in order to distribute water from the water inlet pipe (3). The water distribution sheet has two holes in the middle and lifted edge around the water inlet pipe (3) and overflow water pipe (4). The water distribution sheet (2) assists in uniformly distributing water onto the coarse filtering materials arranged between the coarse filtering basket (1) and the water distribution sheet (2). This allows better efficiency through the filtering via the profile of the coarse filtering material sheet. At the upper part of the coarse filtering basket (1), there are fins deliberately arranged in order to lift up the coarse filtering materials from the basket itself thereby preventing a direct attachment between the coarse filtering materials and the basket. In the middle of the coarse filtering basket, there is a solid section. The holes are provided around the said section in the form of a sieve in order to particularly direct the flow of water to the filtering material positioned downward.

Figure 3:
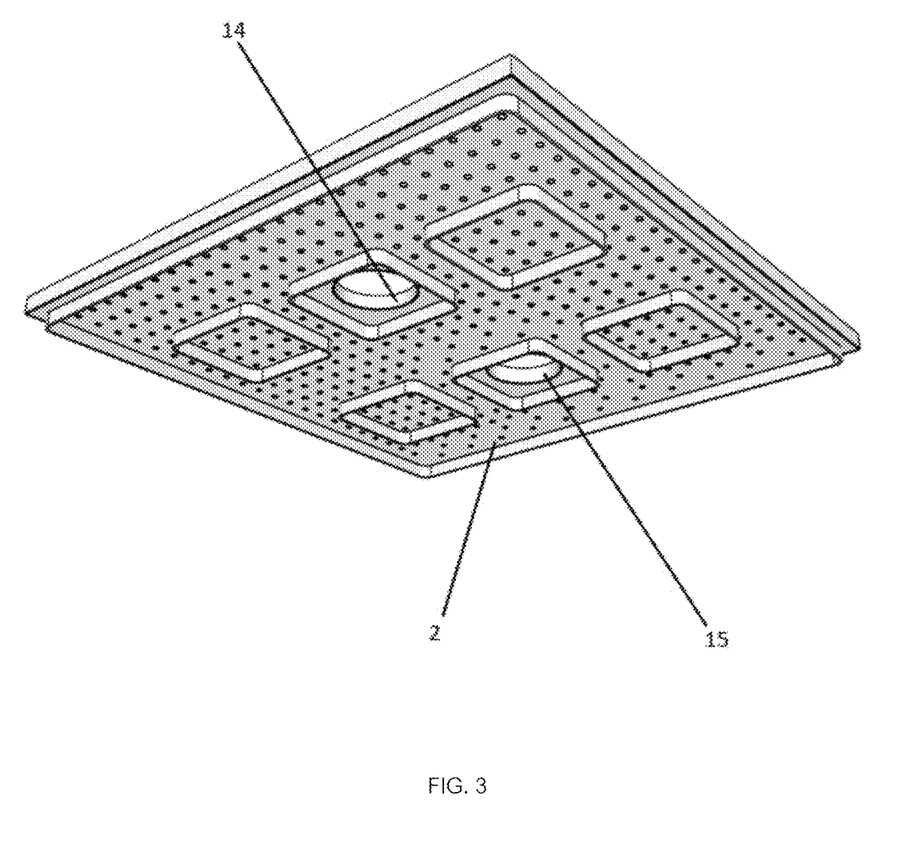
FIG. 3 shows separate and partial components of the water distribution sheet shown in FIG. 2

FIG. 3 shows separate components partially seen in FIG. 2 (water distribution sheet). The water distribution sheet is provided in the form of a punched sieve in order to uniformly distribute water onto the coarse filtering material sheet. At the bottom of the water distribution sheet, there is a volume of fins positioned around the sheet. This is to lift it up so that there is no attachment to the coarse filtering sheet and to obtain a good flow of water. The water distribution sheet itself also has two holes in the middle and has the edges lifted up around the water inlet pipe (2) and the overflow water pipe (4). When the coarse filtering material sheet is clogged up, water will overflow through the overflow water pipe (4) toward the filtering materials in the filtering material basket (1) positioned directly downward. The water will then not overflow outside the filtering tank in case that the filtering material sheet is clogged up.

Figure 4:
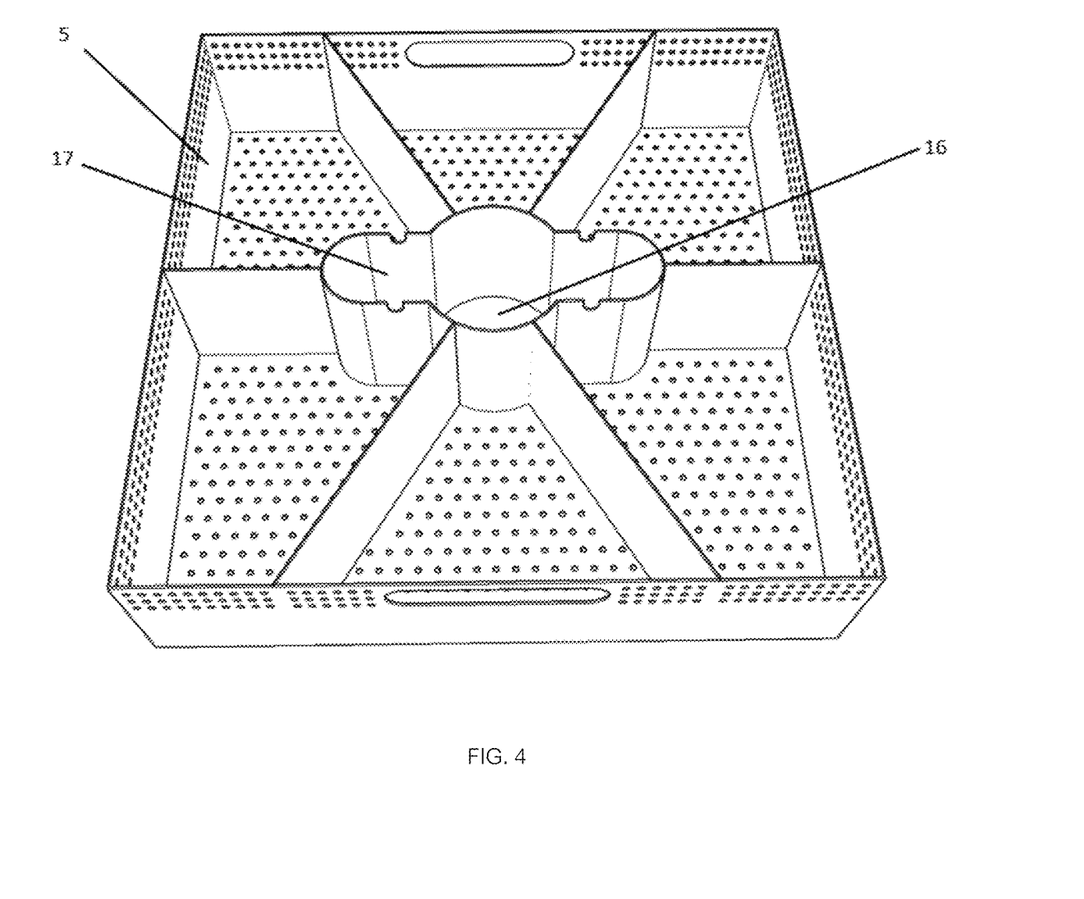
FIG. 4 shows the filtering material basket

FIG. 4 shows the baskets for containing filtering materials.

The basket itself is used for separating various types of filtering materials and allows for ease in the maintenance of the Filtering materials. The basket base is in the form of a punched sieve used for uniformly distributing water. The side of the basket comprises openings for lifting so that the basket can be easily transported. The basket is separated into 6 sections for containing filtering materials. In the middle of basket, there is a space for a siphon pipe (16) and a water inlet pipe (17).

Figure 5:
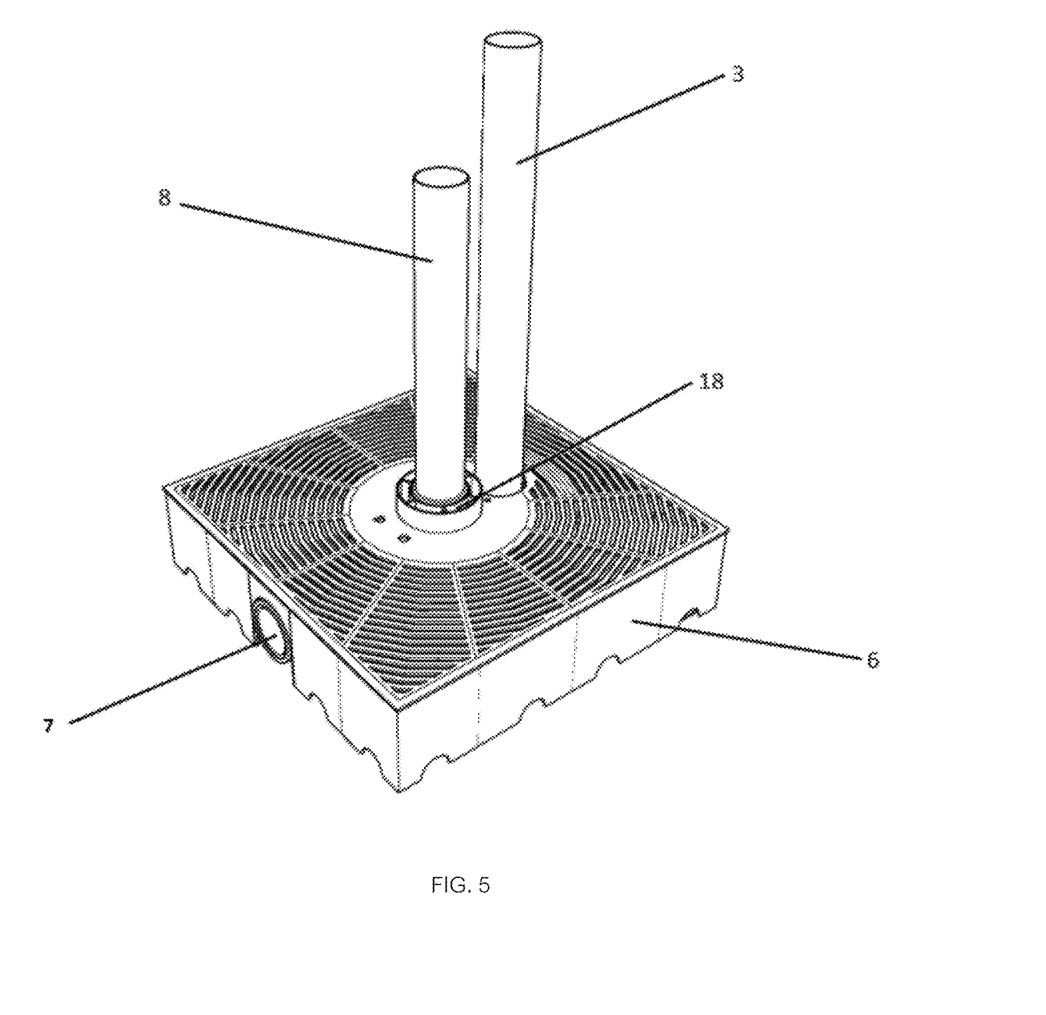
FIG. 5 shows the supporting base of the siphon pipe

FIG. 5 shows the supporting base of the siphon pipe

The supporting base of the siphon pipe comprises a water inlet pipe (3), a water outlet stand pipe (8), a siphon control pipe (9), a siphon pipe coupler (18), and a water outlet pipe (7). An inlet water pipe is provided to allow water to flow into the tank. Water will be distributed uniformly. When the water level reaches the same level of the opening of the water outlet stand pipe (8), water will be sucked up from the tank through the water outlet stand pipe (8) which is connected to the water outlet pipe (7). The function of the supporting base of the siphon pipe (6) is to hold the siphon pipe (10), the water inlet pipe (3), and the water outlet stand pipe (8) together in a secure manner and in the appropriate balance positions. The base also helps in lifting up the siphon pipe (10) so that the bottom area of the supporting base of the siphon pipe acts as a passage for the water inlet pipe (3) and the water outlet pipe (7). Additionally, the siphon pipe base (6) also significantly functions to help in siphoning to the side or wall of the tank. Thus, in operation, the filtering tank can be positioned on the wall without a base similar to that of an aquaponics system. The siphon pipe coupler (18) is used to connect the siphon pipe (10) in a stable manner and in a balance position. With regard to the siphon control pipe (9), the said pipe will stop the siphoning from the tank and reduce the sound caused by the stop of siphoning and can also control the water level at the desired level. The bottom hole of the siphon control pipe (13) is the stop position in filling the water into the siphon control pipe (9). When water in the siphon control pipe (9) is completely sucked up by using the snock pipe (11), air will flow inside the siphon pipe thereby stopping the siphoning process. This enables the ability to control the level of remaining water in the filtering tank as desired. In the tide water filtering tanks having high circulation, there are two separate sections. The upper section is the section where there is a change of the water level and the lower section always has water inside. When the water level in the upper section is changed continuously, naturally, air and water will also circulate into the tank continuously. Thus, an oxygen pump is not necessary for this filtering system. For releasing water from the filtering tank, water will be partially released by releasing water at the lower section and the water in the water section will then flow to the lower section. Water will be filled in the upper section all the time until full and water will then be released from the filtering tank. Rounds of the process will be repeated. Based on this principle, air and water will penetrate filtering materials thoroughly thereby enabling filtering material to be used at full efficiency.

Figure 6:
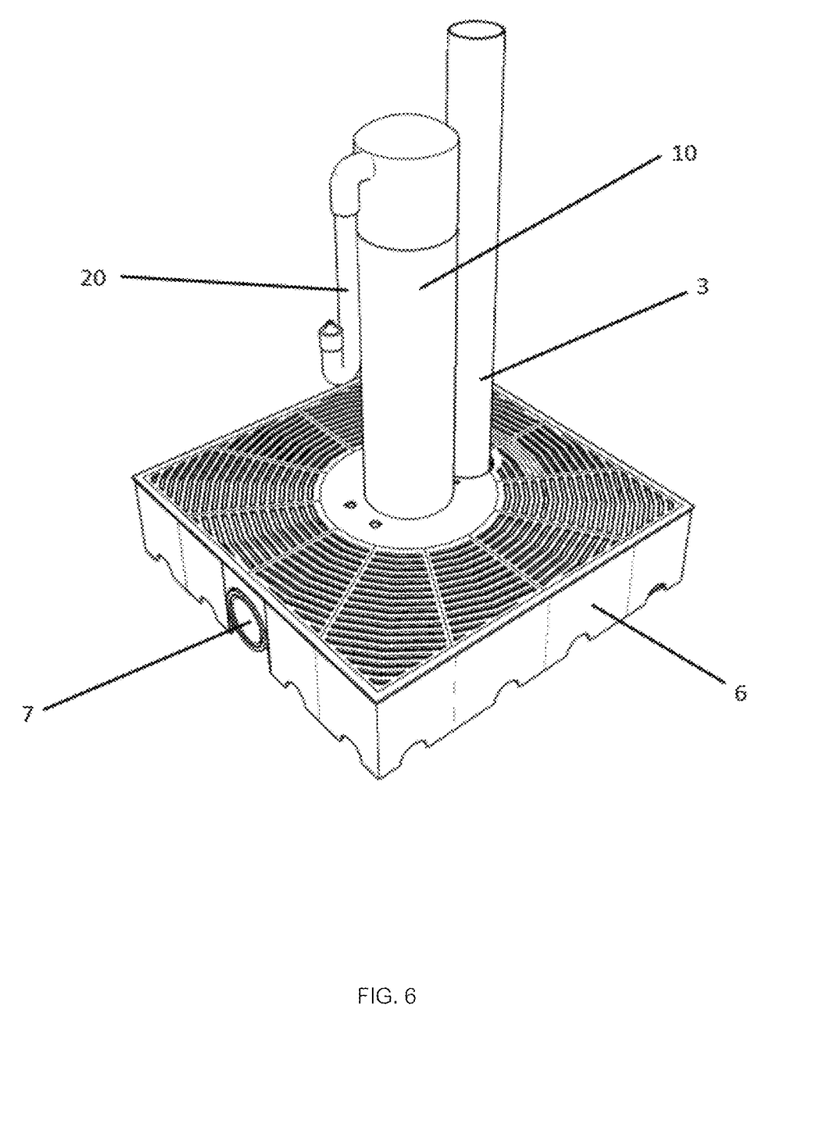
FIG. 6 additionally shows the supporting base of the siphon pipe

FIG. 6 additionally shows the base of siphon pipe. The addition from the FIG. 5 is that there is a siphon pipe (10) covering water outlet stand pipe (8) and U-turn shape snock pipe (20) will be inserted into the siphon control pipe (9). The water circulation can be explained as follows: water will flow through the sieve of the siphon pipe supporting base and further flow toward the center of the siphon pipe supporting base and then flow upward through and between the siphon pipe (10) and the water outlet stand pipe (8) before reverting downward again through the water outlet stand pipe (8) toward the water outlet pipe (7).

Figure 7:
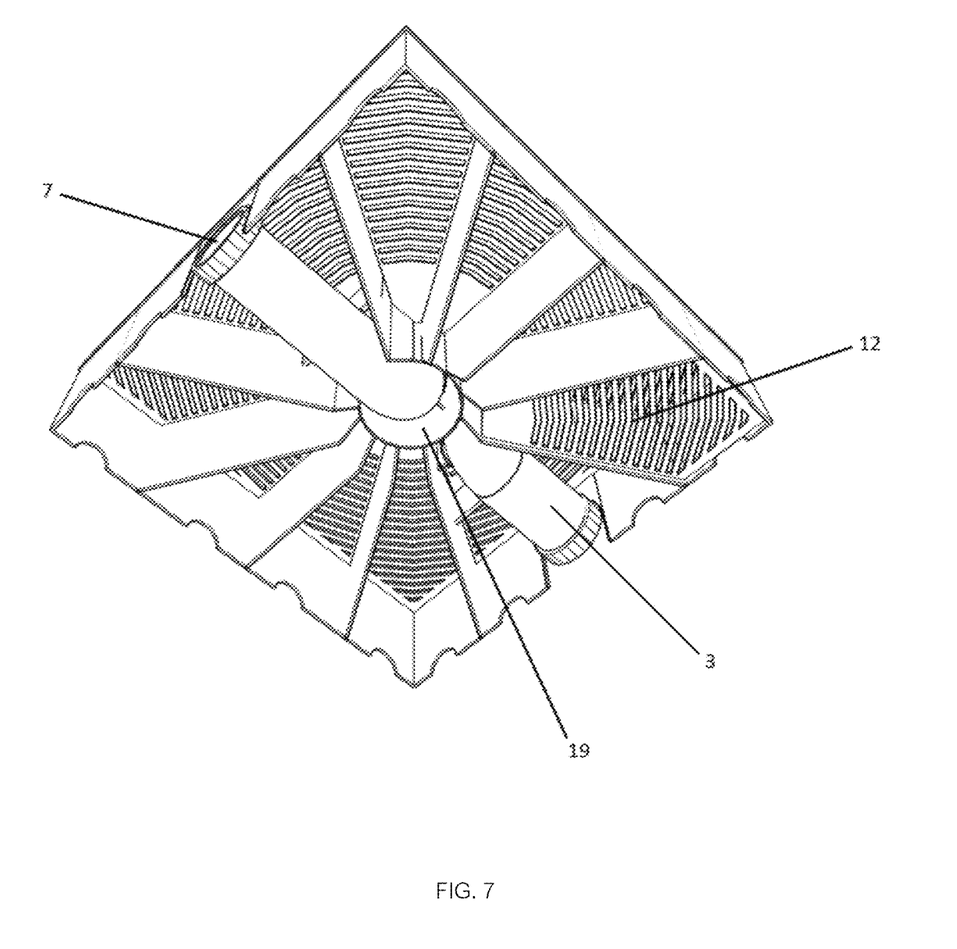
FIG. 7 shows the view underneath the supporting base of the siphon pipe

FIG. 7 shows the image under the supporting base of the siphon pipe which comprises 12 sections. Four sections are left empty for use as passages for the water inlet pipe (3) and the water outlet pipe (7). The other eight sections comprise sieve sheets attached under the base (12) for filling in the filtering materials in order to use all the areas inside the filtering tank efficiently. At the middle of the supporting base of the siphon pipe, there will be a water inlet toward the siphon pipe (19) and the water outlet stand pipe (8). In the middle area around the siphon pipe couple, this is designed to be a solid area having the punched sieve around the said area in order to direct the flow of water through the outer rim sieve before flowing toward the center of the siphon pipe. This principle will direct the water to flow completely through filtering material inside the tank without any blind spots.

FIG. 8 shows the cross sectional and vertical view of the FIG. 1.

From the cross-sectional view of the tide water filtering tanks having high circulation, it can be seen that the water outlet pipe (7) is positioned across the water inlet pipe (3). When water flows into the tank through the water inlet pipe (3), water will be distributed by the water distribution sheet (2). On the water distribution sheet, there is an overflow water pipe (4) that will prevent the water from overflowing outside the filtering tank when the coarse filtering materials are clogged up. In the case that there is a clog, the water level will increase and the water will overflow through the overflow water pipe (4) directly toward the filtering materials basket (5). In a normal situation, water is distributed by using the water distributing sheet (2) on the coarse filtering material sheet. Thereafter, water will flow through the coarse filtering basket (1) and be distributed to the filtering materials in each layer of the filtering materials basket in a raining manner. When the water level inside the tank is higher to the extent that the level is equal to the top of the water outlet stand pipe (8), water will be sucked out into the siphon pipe (19). Water will flow between the siphon pipe (10) and the water outlet stand pipe (8) and revert downward to the water outlet stand pipe connected to the water outlet pipe (7) at a high speed in order to release water from the filtering tank.

The siphon control pipe (9) will stop the siphoning process from the filtering tank and reduce the sound caused by the stop of the siphoning process. We can control the level of the remaining water inside the tank as follows: the bottom holes of the siphon control pipe (13) are the stop position in filling water into the siphon control pipe (9). When water in the control pipe (9) is sucked up completely with the snock pipe (11), air will flow and penetrate into the siphon pipe thereby stopping the siphoning process and enabling the control of the remaining water level as desired. The design also hides all the pipes inside the tank for security, stability, and beauty. Thus, there are no pipes extended outward from the tank as exists in other filtering systems.

Figure 9:
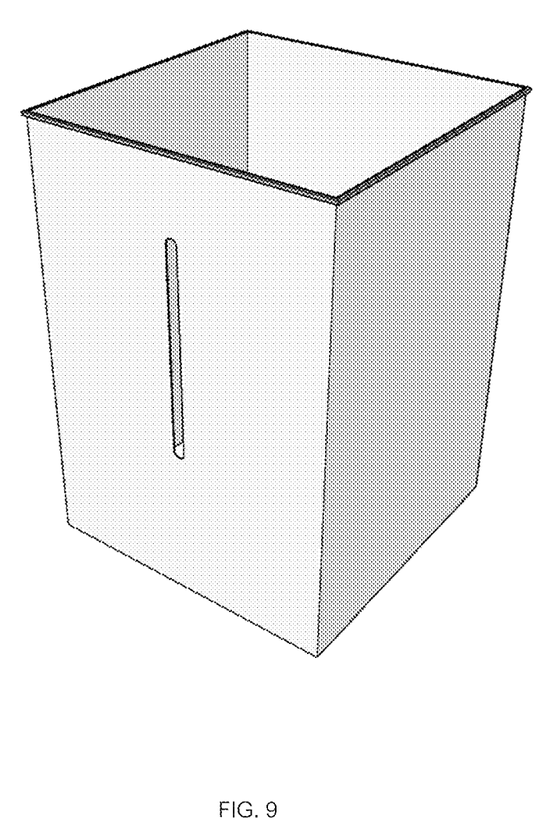
FIG. 9 shows the external view of the tide water filtering tanks having high circulation

FIG. 9 shows the external view of the tide water filtering tanks having high circulation.

The external wall of the tide water filtering tanks having high circulation comprises the transparent opening for viewing the interior of the filtering tanks along with the operation inside the tide water filtering tanks having high circulation.

It will be appreciated by persons skilled in the art that the present inventions are not limited by what has been particularly shown described herein above. Rather the scope of the present invention includes both combinations and sub-combinations of the features described herein above as well as modifications and variations thereof which would occur to a person of skill in the art upon reading the foregoing description and which are not in the prior art.

BEST MODE

As disclosed in the detailed descriptions of the preferred embodiment.

What is claimed is:

1. A water filtering tank comprising:
   a housing of the water filtering tank;
   a water inlet pipe installed on the housing receiving water into the tank;
   a water distributing sheet in which the said sheet is arranged inside the tank at a height lower than the inlet pipe in which the said distributing sheet receives water flow through the inlet and comprises a plurality of pores positioned throughout the said sheet;
   a rough filtering basket in which the supporting lower surface comprises a plurality of pores and the said basket comprises rough filtering materials inside which arranged in the basket at a height less than the distributing sheet and receives water flow through the said water distributing sheet;
   a filtering material basket which is arranged inside the basket at a height less than that of the rough filtering basket and comprises the filtering materials arranged into multiple layers;
   a water outlet pipe installed with the housing and releases water;
   wherein the water filtering basket comprises a siphon tube supporting base which is arranged at the lower part of the housing and further comprises a water outlet standing pipe vertically installed on the said base and has a height less than the height of the inlet in which water is sucked out of the housing through the lower water outlet standing pipe connected with the water outlet pipe when water level filled inside the housing is at the same level as that of the water outlet standing pipe, siphon tube covering the water outlet standing pipe and further comprises a snock tube in which is in the U-shape having one end connected with the siphon tube at the predetermined height.

2. The water filtering tank as cited in claim 1 wherein the rough filtering basket comprises fins dispersedly arranged on the upper surface of the basket.

3. The water filtering tank as cited in claim 2 wherein the rough filtering basket comprises a overflow water tube vertically installed on the surface of the said basket.

4. The water filtering tank as cited in claim 1 wherein the area inside the filtering material basket is divided into multiple spaces for containing filtering materials.

5. The water filtering tank as cited in claim 1 further comprising siphon tube connector arranged to connect siphon tube with the siphon tube supporting base.

6. The water filtering tank as cited in claim 1 wherein the rough filtering basket comprises overflow water tube vertically installed on the surface of the said basket.

* * * * *